(12) United States Patent
Taguchi et al.

(10) Patent No.: US 7,674,445 B2
(45) Date of Patent: Mar. 9, 2010

(54) METHOD FOR PURIFYING HYDROGEN IN A REFORMED GAS

(75) Inventors: Kiyoshi Taguchi, Moriguchi (JP); Takeshi Tomizawa, Ikoma (JP); Kunihiro Ukai, Ikoma (JP); Kimiyasu Honda, Kusatsu (JP); Toshiyuki Shono, Kyoto (JP); Kouchiro Kitagawa, Kadoma (JP)

(73) Assignee: Panasonic Corporation, Osaka (JP)

( * ) Notice: Subject to any disclaimer, the term of this patent is extended or adjusted under 35 U.S.C. 154(b) by 309 days.

(21) Appl. No.: 11/456,027

(22) Filed: Jul. 6, 2006

(65) Prior Publication Data

US 2006/0233690 A1 Oct. 19, 2006

Related U.S. Application Data

(62) Division of application No. 09/357,507, filed on Jul. 20, 1999, now abandoned.

(30) Foreign Application Priority Data

Jul. 29, 1998 (JP) .................................. 10-213684
Apr. 9, 1999 (JP) .................................. 11-102608

(51) Int. Cl.
*B01D 53/62* (2006.01)
(52) U.S. Cl. ........................... 423/247; 95/114; 95/140; 422/173; 422/177
(58) Field of Classification Search ................. 423/247, 423/246; 95/114, 115, 116, 140; 422/168, 422/173, 177
See application file for complete search history.

(56) References Cited

U.S. PATENT DOCUMENTS

| 2,898,183 | A |   | 8/1959  | Fauser |
|---|---|---|---|---|
| 3,109,715 | A |   | 11/1963 | Johnson |
| 3,262,758 | A |   | 7/1966  | Russell |
| 3,345,136 | A |   | 10/1967 | Finneran, Jr. |
| 3,785,781 | A |   | 1/1974  | Hervert |
| 3,910,770 | A |   | 10/1975 | Kobylinski |
| 3,914,377 | A | * | 10/1975 | Anderson et al. ........ 423/213.7 |
| 3,962,869 | A |   | 6/1976  | Wossner |
| 4,118,199 | A |   | 10/1978 | Volker |
| 4,714,593 | A | * | 12/1987 | Naito et al. ................. 422/197 |
| 5,271,916 | A |   | 12/1993 | Vanderborgh |
| 5,330,727 | A |   | 7/1994  | Trocciola |

(Continued)

FOREIGN PATENT DOCUMENTS

DE          43 34 983 A1    4/1995

(Continued)

*Primary Examiner*—Stanley S. Silverman
*Assistant Examiner*—Daniel C. McCracken
(74) *Attorney, Agent, or Firm*—Panitch Schwarze Belisario & Nadel LLP

(57) ABSTRACT

A hydrogen purifying apparatus and method are provided for oxidizing and removing carbon monoxide (CO) in a modified gas containing CO in addition to a main component hydrogen gas. The apparatus and method use comprises a catalyst reaction segment having a catalyst layer for oxidizing CO, a material gas supplying segment for supplying the modified gas to the reaction segment via a material gas supply pathway, and an oxidant gas supplying segment for supplying an oxidant gas on the path of the material gas supply pathway. Preferably, the apparatus further comprises means for cooling the catalyst layer at the upstream side and means for heating the catalyst layer at the downstream side.

7 Claims, 9 Drawing Sheets

U.S. PATENT DOCUMENTS

| | | |
|---|---|---|
| 5,464,606 A | 11/1995 | Buswell |
| 5,518,705 A * | 5/1996 | Buswell et al. .......... 423/437.2 |
| 5,609,832 A | 3/1997 | Mieville |
| 5,874,051 A * | 2/1999 | Heil et al. ................... 422/171 |
| 6,029,443 A | 2/2000 | Hirota |

FOREIGN PATENT DOCUMENTS

| | | |
|---|---|---|
| DE | 195 44 895 C1 | 2/1997 |
| DE | 195 39 648 A1 | 5/1997 |
| GB | 2233748 A | 1/1991 |
| JP | 5-201702 | 8/1993 |
| JP | 06-064901 | 3/1994 |
| JP | 10101303 A | 4/1998 |
| WO | WO 95/08850 A1 | 3/1995 |
| WO | WO 97/25752 A1 | 7/1997 |

* cited by examiner

METHOD FOR PURIFYING HYDROGEN IN A REFORMED GAS

CROSS-REFERENCE TO RELATED APPLICATIONS

This application is a divisional of U.S. patent application Ser. No. 09/357,507, filed Jul. 20, 1999, the disclosure of which is incorporated herein by reference.

BACKGROUND OF THE INVENTION

The present invention relates to a hydrogen purifying apparatus and method for use in fuel cells such as solid polymer electrolyte fuel cell. More specifically, the present invention relates to a hydrogen purifying apparatus and method for reducing a concentration of carbon monoxide in a modified gas containing gaseous hydrogen and carbon monoxide.

As the fuel gas for use in fuel cells, a modified gas is used which can be obtained by reforming a material, such as hydrocarbon including natural gas, alcohol including methanol, or naphtha, with a water vapor. Such modified gas normally contains byproducts including carbon monoxide and carbon dioxide in addition to hydrogen gas.

Fuel cells which can operate at high temperatures, such as molten carbonate fuel cell, can even utilize carbon monoxide as a fuel. However, for fuel cells with lower operating temperatures, such as phosphoric acid fuel cell and solid polymer electrolyte fuel cell, the presence of a high concentration of carbon monoxide in the hydrogen gas is poisonous to any platinum group metallic catalyst which is utilized by an electrode of the cell. As a result, such cell can not exert satisfactory electric power generating performance. For the solid polymer electrolyte fuel cell in particular, the electrode catalyst is poisoned with carbon monoxide in a relatively short time even if the concentration of carbon monoxide in the fuel gas is as low as 50 ppm or so, producing rapid impairment of the electric power generating performance of the cell.

Therefore, carbon monoxide is removed by oxidizing it using a platinum group metallic catalyst after reducing the concentration of carbon monoxide in the fuel gas with a carbon monoxide metamorphic catalyst.

An example of the method for removing carbon monoxide by oxidation is to oxidize only carbon monoxide selectively at low temperature using a catalyst carrying on the carrier alumina a known activator platinum or rhodium thereby removing the carbon monoxide (see Japanese Laid-Open Patent Publication No. Hei 5-201702, for example).

As an alternative, there is a method which provides an oxidation catalyst of carbon monoxide on the flow route of the fuel gas toward the fuel cell and then introduces open air in order to supply sufficient amounts of oxygen (oxidant) to the fuel gas thereby effectively oxidizing and removing carbon monoxide (see Japanese Laid-Open Patent Publication No. Hei 9-504901, for example).

According to the methods, the concentration of carbon monoxide in the fuel gas can be reduced to as low as 10 ppm or so which is lower than the poisonous concentration to the electrode catalyst.

However, under practical use conditions, since the concentration of carbon monoxide in the fuel gas changes as the amount of fuel gas supplied to the fuel cell changes, it is necessary to control the supplying amount of open air as appropriate. However, the oxidation reaction of carbon monoxide in the presence of oxidation catalyst accompanies heat generation and thus alters the temperature of the electrode catalyst when the supplying amount of open air to the fuel gas is varied. There is a problem in the prior art methods that when the catalyst temperature is altered and reaches outside the optimal temperature range of the catalyst activity, oxidation and removal of carbon monoxide becomes unsatisfactory.

Another problem is that excess supply of open air increases the amount of heat generated by the oxidation catalyst and elevates the temperature of the catalyst. Heat generation is concentrated particularly at the catalyst close to the side into which the fuel gas is introduced, producing a high temperature around there in a short time. Since hydrogen is more reactive to the catalyst than carbon monoxide, the oxygen supplied as an oxidant is mostly consumed for oxidizing hydrogen rather than carbon monoxide, if the catalyst has a high temperature. As a result, the catalyst loses the ability to selectively oxidize carbon monoxide.

Under such circumstances, it is essential in the hydrogen purifying apparatus to control the catalyst temperature in a range at which carbon monoxide readily reacts with the catalyst but hydrogen does not. In other words, reduction in the change, particularly elevation of catalyst temperature is required.

The most efficient temperature for oxidizing carbon monoxide is a critical low temperature at which carbon monoxide can react with the catalyst. However, control of the temperature of the oxidation catalyst which selectively oxidizes carbon monoxide by regulating the amount of fuel gas to be supplied to the fuel cell or by cooling the catalyst eventually excretes drastic amounts of carbon monoxide upon only a slight decrease of the temperature. Therefore, the prior art methods required control of the temperature within a range of several to several tens degrees centigrade higher than the critical low temperature, in consideration of the flow rate of the fuel gas and possible changes in the catalyst temperature. As such, the conventional methods have met difficulties considerably in achieving selective and efficient oxidation of carbon monoxide.

Furthermore, the oxygen supplied is constantly consumed for oxidizing hydrogen gas as the fuel while being consumed for oxidizing carbon monoxide. This means that there is a need to reduce the supplying amount of open air to a minimum. However, if the catalyst is elevated in temperature when the oxygen amount in hydrogen gas is insufficient due to down-regulated amounts of open air to be supplied, production of carbon monoxide proceeds due to reaction equilibrium between the carbon dioxide and hydrogen. Therefore, the air to be supplied must be controlled exactly and precisely to a right amount. In order to satisfy the above requirement, the conventional hydrogen purifying apparatus meets a problem that it is inevitably complicated in structure.

In view of the above-mentioned various facts, the object of the present invention is to provide a hydrogen purifying apparatus in which the catalyst for selectively oxidizing carbon monoxide can exert the ability sufficiently and the concentration of carbon monoxide in the fuel gas (hydrogen gas in this case) can be reduced constantly and stably even when the use conditions of the apparatus, such as temperature, amounts of open air to be supplied and amounts of carbon monoxide to be treated are varied.

BRIEF SUMMARY OF THE INVENTION

The present invention relates to a hydrogen purifying apparatus and method for oxidizing and removing carbon monoxide (CO) in a modified gas containing CO in addition to a main component hydrogen gas, comprising a catalyst reaction segment having a catalyst layer for oxidizing CO, a material gas supplying segment for supplying the modified gas to the reaction segment via a material gas supply pathway, an oxidant gas supplying segment for supplying an oxidant gas on the path of the material gas supply pathway, means for cooling the catalyst layer at the upstream side, and means for heating the catalyst layer at the downstream side.

In a preferred mode of the present invention, the means for cooling the catalyst layer at the upstream side is a water-cooled apparatus and the means for heating the catalyst layer at the downstream side is a heater.

In another preferred mode of the present invention, the upstream side of the catalyst layer is formed by a different catalyst from that of the downstream side, and the catalyst constituting the downstream side exerts the activity at lower temperature than that of the catalyst constituting the upstream side.

In a further preferred mode of the present invention, the reaction segment may further comprise two or more catalyst layers. In such case, it is preferable to form an oxidant gas supplying segment in each catalyst layer.

In a still further preferred mode of the present invention, the catalyst layer carries a catalyst on a carrier having a honeycomb structure or a foamed structure with communicating pores.

The catalyst layer is preferably made of a metal carrier carrying the catalyst thereon.

The heating means is preferably one which utilizes reaction heat generated by reaction of CO and hydrogen in the modified gas with the oxidant gas.

It is desirable for the catalyst layer that the downstream side has a higher temperature than the upstream side.

In a still further preferred mode of the present invention, the hydrogen purifying apparatus further comprises means for changing the supplying amount of the oxidant gas in correspondence with the elevation in temperature of the catalyst layer.

In a still further preferred mode of the present invention, the hydrogen purifying apparatus is provided with a flow route of the modified gas at a position close to or in close contact with the catalyst layer via a partition so as to utilize heat of the modified gas before the passage through the cooling means in heating the downstream side of the catalyst layer.

It is desired that the modified gas passes through the catalyst layer in an opposing direction of stream to that before it passes through the cooling means.

It is further desired that the reaction segment is formed on the periphery of the flow route of the modified gas before the passage through the catalyst layer.

It is also preferred that the reaction segment is tube-shaped and the flow route of the modified gas before the passage through the cooling means is formed around the reaction segment.

It is also preferable to connect two or more reaction segments in parallel.

In a further preferred mode of the present invention, the hydrogen purifying apparatus is provided with a branch which bifurcates downstream from the connection between the material gas supply pathway and the oxidant gas supply pathway and is connected to the reaction segment on the path of the catalyst layer, the branch doubling as the means for cooling the upstream side of the catalyst layer or otherwise heating the downstream side of the catalyst layer.

In the above case, the hydrogen purifying apparatus preferably further comprises means for changing the cross-sectional area of the material gas supply pathway and the branch at their connection to the reaction segment in order to control the amount of modified gas to be supplied to the reaction segment from the material gas supply pathway and the branch.

It is desirable that the reaction segment has at least a two-segmented catalyst layer and at least the uppermost catalyst layer has a part with no catalytic function or a part with low reactivity to CO.

It is also desirable the reaction segment has at least a two-segmented catalyst layer, and at least the uppermost catalyst layer is composed of a catalyst pellet and the lowermost catalyst layer is a honeycomb.

It is further desirable that the reaction segment has at least a two-segmented honeycomb catalyst layer, and the uppermost catalyst layer is larger than the lowermost catalyst layer with respect to an open area of their honeycomb lattice.

It is preferred that the catalyst constituting the uppermost catalyst layer carries on the alumina carrier a platinum group metallic activator, and the catalyst constituting the lowermost catalyst layer carries on the zeolite carrier an identical platinum group metallic activator.

The former catalyst is preferably one which has been heat-treated at a higher temperature than the latter catalyst.

It is preferable for the catalyst layer to have a temperature measuring segment and means for controlling the supplying amount of oxidant gas based on the temperature as measured.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
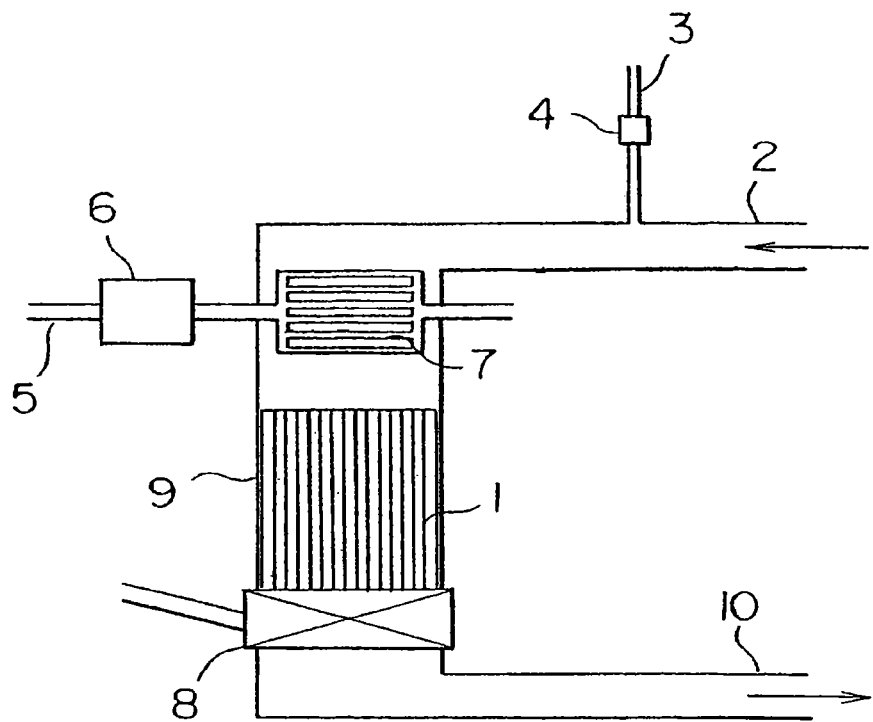
FIG. 1 is a schematic cross-sectional sketch illustrating a hydrogen purifying apparatus embodied in the below-mentioned Embodiment 1-1 of the present invention.

The present invention relates to a hydrogen purifying apparatus (or a CO cleanup apparatus) and method for oxidizing and removing carbon monoxide (CO) in a modified gas containing CO in addition to a main component hydrogen gas, comprising a catalyst reaction segment having a catalyst layer for oxidizing CO, a material gas supplying segment for supplying the modified gas to the reaction segment via a material gas supply pathway, and an oxidant gas supplying segment for supplying an oxidant gas on the path of the material gas supply pathway. The most characteristic feature of the present invention is further provisions of means for cooling the catalyst layer at the upstream side, and means for heating the catalyst layer at the downstream side.

The presence of such means facilitates efficient oxidation and removal of undesirable carbon monoxide in the modified gas. In other words, such means helps the catalyst which selectively oxidizes CO to exert the ability sufficiently and to reduce CO concentration in the fuel gas (hydrogen gas in this case) stably and constantly even if the use conditions of the apparatus, such as temperature, amounts of open air to be supplied and amounts of CO to be treated are varied.

Here, the means for cooling the upstream side of the catalyst layer and the means for heating the downstream side of the catalyst layer can be embodied in two forms. In the following, Embodiment 1 and Embodiment 2 of the present invention will be described.

EMBODIMENT 1

Embodiment 1 of the present invention uses a water-cooled apparatus as the means for cooling the upstream side of the catalyst layer and a heater as the means for heating the downstream side of the catalyst layer. The use of such means helps the catalyst for selectively oxidizing only CO to exert the function stably and facilitates control of the catalyst temperature.

In the present embodiment, the means for cooling the upstream side of the catalyst layer is preferably a water-cooled apparatus and the means for heating the downstream side of the catalyst layer is preferably a heater.

It is also preferred that the upstream side of the catalyst layer is formed by a different catalyst from that of the downstream side and that the catalyst constituting the downstream side of the catalyst layer is activated at a temperature lower than the catalyst constituting the upstream side.

The reaction segment may have two or more catalyst layers. In that case, it is preferable to form the oxidant gas supplying segment in each catalyst layer.

A preferred configuration of the catalyst layer is to carry the catalyst on a honeycomb base or a foamed base having communicating pores.

The catalyst layer is preferably composed of a metallic base carrying the catalyst thereon.

The heating means is preferably such one that utilizes reaction heat generated by the reaction of CO and hydrogen in the modified gas with the oxidant gas.

It is also preferable to set the temperature of the downstream side of the catalyst layer higher than that of the upstream side.

It is preferable to further provide means for changing the amount of oxidant gas to be supplied in correspondence with the elevation of the temperature of the catalyst layer.

The hydrogen purifying apparatus in accordance with the present invention is preferably provided with a flow route of the modified gas at a position close to or in close contact with the catalyst layer via a partition so as to utilize heat of the modified gas before the passage through the cooling means in heating the downstream side of the catalyst layer.

It is desired that the modified gas passes through the catalyst layer in an opposing direction of stream to that before it passes through the cooling means.

It is further desired that the reaction segment is formed on the periphery of the flow route of the modified gas before the passage through the catalyst layer.

It is also preferred that the reaction segment is tube-shaped and the flow route of the modified gas before the passage through the cooling means is formed around the reaction segment.

It is also preferable to connect two or more reaction segments in parallel.

Embodiment 1-1

FIG. 1 is a schematic cross-sectional sketch of the hydrogen purifying apparatus embodied in Embodiment 1-1 in accordance with the present invention. As shown in FIG. 1, the hydrogen purifying apparatus comprises a catalyst layer 1, a modified gas inlet 2, an air supply duct 3, an air flow rate control valve 4, a cooled water supply duct 5, a cooled water volume control valve 6, a heat exchanger 7, a heater 8, a reaction chamber 9, and a modified gas outlet 10.

In the following, the operation and the technical feature of the present embodiment will be described.

When a fuel is reformed with a water vapor, the CO concentration in the resultant fuel increases as the reaction temperature is elevated. When the fuel is methanol which can be reformed at 300° C. or lower, the resultant modified gas has a CO concentration of 1% or so. Therefore, the modified gas can be directly introduced through the modified gas inlet 2. To the contrary, when the fuel is methane or natural gas both requiring 600° C. or so for causing reaction, the resultant modified gas inevitably contains 10% CO or more due to equilibrium of aqueous gas shift reaction. Therefore, such modified gas is reduced in the concentration of CO to 1% or less by reacting it with water vapor using a metamorphic catalyst to convert CO to carbon dioxide and hydrogen before it is introduced into the apparatus through the modified gas inlet 2.

In order to oxidize the CO in the modified gas, open air is introduced from the air supply duct 3 to cause reaction between the CO and air at the catalyst layer 1. If the introduced air is too little, CO can not react with air sufficiently. If the introduced air is excessive, hydrogen consumption increases. Therefore, the air volume to be supplied is regulated by the air flow rate control valve 4 such that oxygen is contained one to threefold the amount of CO (volume ratio). The modified gas mixed with air is cooled with the heat exchanger 7 down to a temperature at which the activating temperature of the catalyst, that is, the catalytic activity for CO of the catalyst starts to decrease rapidly, or even lower than that temperature. Then, the modified gas is supplied to the catalyst layer 1.

Figure 2:
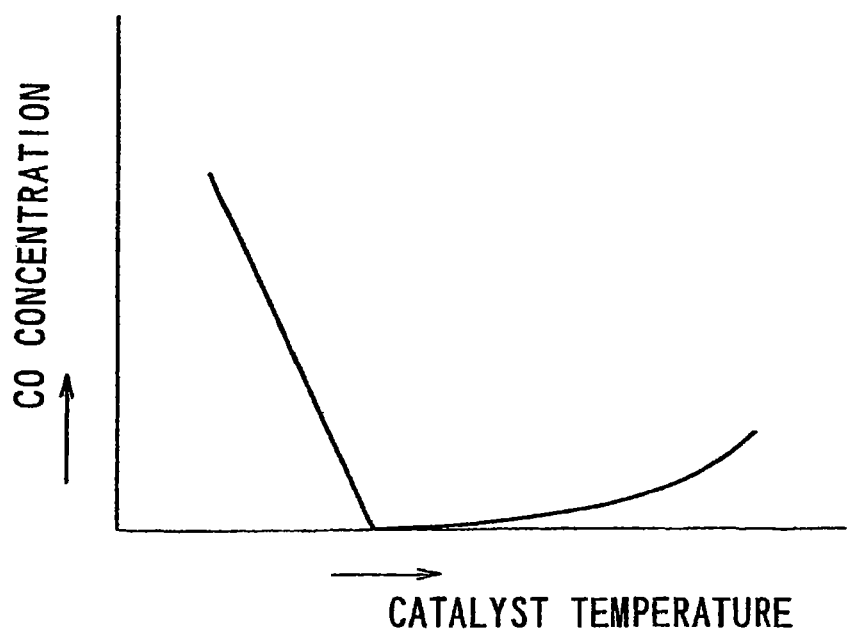
FIG. 2 is a graph illustrating the relationship between the operating temperature of the catalyst for selectively oxidizing CO and the CO concentration in a modified gas which has passed through the catalyst layer obtained from the hydrogen purifying apparatus of FIG. 1.

The catalyst layer 1 used here is a ceramic honeycomb base coated with alumina carrying thereon platinum. The catalyst layer 1 exhibits the characteristics as shown in FIG. 2. In other words, since CO in the modified gas becomes reactive at a lower temperature than hydrogen does, the lower the catalyst temperature, the lower the concentration of CO to be exhausted. If the temperature is lowered excessively, the temperature becomes lower than the activating temperature of the catalyst. As a result, CO becomes nonreactive, which results in an abrupt increase of CO to be exhausted.

The catalyst layer 1 has been controlled such that the upstream side has a temperature around or lower than an activating temperature of the catalyst as used using the cooling effect of the heat exchanger 7, and the temperature increases gradually toward downstream. This structure enables formation of a temperature zone at which CO is most efficiently reacted with the catalyst layer. In this way, the CO concentration in the modified gas can be reduced to the extent of as low as several ppm which is a level not impairing the performance of any solid polymer electrolyte fuel cell. Any change in the temperature of the modified gas or the cooling apparatus more or less would result in a mere shift of the position of the above-mentioned temperature zone toward upstream or downstream and would not interfere with stable removal of CO.

In the present embodiment, although open air was used as the oxidant gas, the use of pure oxygen alleviates the decrease of hydrogen concentration in the modified gas by the amount of nitrogen in open air, because pure oxygen contains no nitrogen. This increases the electric power generating efficiency of the fuel cell which will be connected to the hydrogen purifying apparatus subsequently. However, the use of open air is generally cost-effective.

Similarly, in the present embodiment, although an electric heater was used for heating the catalyst layer 1, oxidation heat generated by CO and hydrogen may be used as the means for heating the downstream side of the catalyst layer 1. By controlling the flow rate of the modified gas passing through the catalyst layer 1 and the ratio of air to be introduced and utilizing oxidation heat by CO and hydrogen, the temperature distribution on the catalyst layer 1 can be optimized without use of an electric heater or with the use of minimal heat by a heater.

CO and hydrogen produce more oxidation heat in proportion to the amount of supplied air. Therefore, regulation of air volume can retain a suitable temperature of the catalyst layer 1. This method enables more stable function of the catalyst layer 1.

In the present embodiment, although the base of the catalyst layer 1 was a codierite honeycomb, any metal base may also be used. The use of such metal base for the base of the catalyst layer enables rapid escape of reaction heat, thus facilitating reduction of temperature rises due to oxidation heat by CO and hydrogen. As a result, treated amounts of modified gas per unit volume by the catalyst layer 1 can be increased and the adverse influence of increases or decreases of the reaction heat due to changes in load on the hydrogen purifying apparatus can be alleviated, leading to stable performance of the apparatus.

Embodiment 1-2

Figure 3:
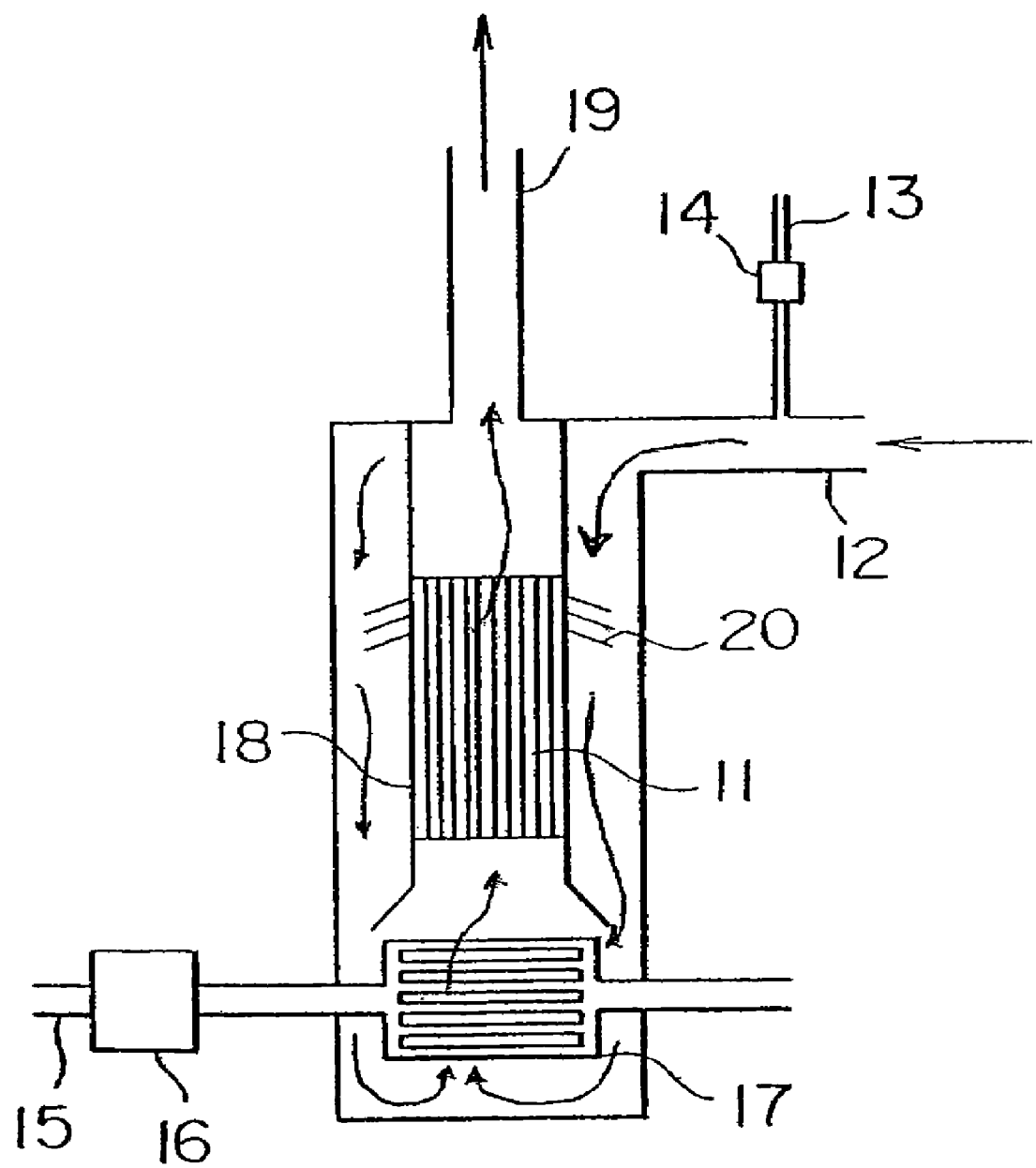
FIG. 3 is a schematic cross-sectional sketch illustrating a hydrogen purifying apparatus embodied in the below-mentioned Embodiment 1-2 of the present invention.

The hydrogen purifying apparatus of Embodiment 1-2 in accordance with the present invention will be described herein. As shown in FIG. 3, the hydrogen purifying apparatus in accordance with the present embodiment comprises a honeycomb catalyst layer 11 formed inside a tube-shaped reaction chamber 18, a modified gas inlet 12, a modified gas flow route formed external to the reaction chamber 18, an air supply duct 13, an air flow rate control valve 14, a cooled water supply duct 15, a cooled volume control valve 16, a heat exchange fin 20 provided on a wall of the modified gas flow route neighboring the downstream side of the catalyst layer 11, and a modified gas outlet 19. The operation and effect of the apparatus of this embodiment are mostly mimicking those of the apparatus of Embodiment 1-1. Therefore, the description of this embodiment will be focused on different features from those of Embodiment 1-1.

FIG. 3 is a schematic cross-sectional sketch illustrating the hydrogen purifying apparatus embodied in Embodiment 1-2. A provision of the heat exchange fin 20 close to the side wall around the downstream side of the catalyst layer 11 helps to heat the downstream side of the catalyst layer 11. Such structure also facilitates cooling the modified gas by a heat exchanger 17. Moreover, since the modified gas flow route thermally insulates the catalyst layer 11, the temperature distribution in the center and the periphery of the catalyst layer 11 becomes homogeneous, thereby enabling efficient oxidation of CO. Due to the structure of the apparatus such that the modified gas passes through the catalyst layer 11 in an opposing direction of stream to that before it passes through the heat exchanger 17, the modified gas at elevated temperature can exchange heat with the downstream side of the catalyst layer 11 and is cooled. Because the modified gas thus cooled then passes along the upstream side of the catalyst layer 11, the temperature of the catalyst layer 11 can be lowered at the upstream side and elevated at the downstream side. As a result, the temperature distribution can be optimized in response to selective oxidation of CO by the catalyst.

In the present example, although the reaction chamber 18 had a single chamber, it can have two or more chambers. Two or more reaction chambers can enhance the efficiency of heat exchange with the modified gas and can cope with a high capacity hydrogen purifying apparatus.

Embodiment 1-3

Figure 4:
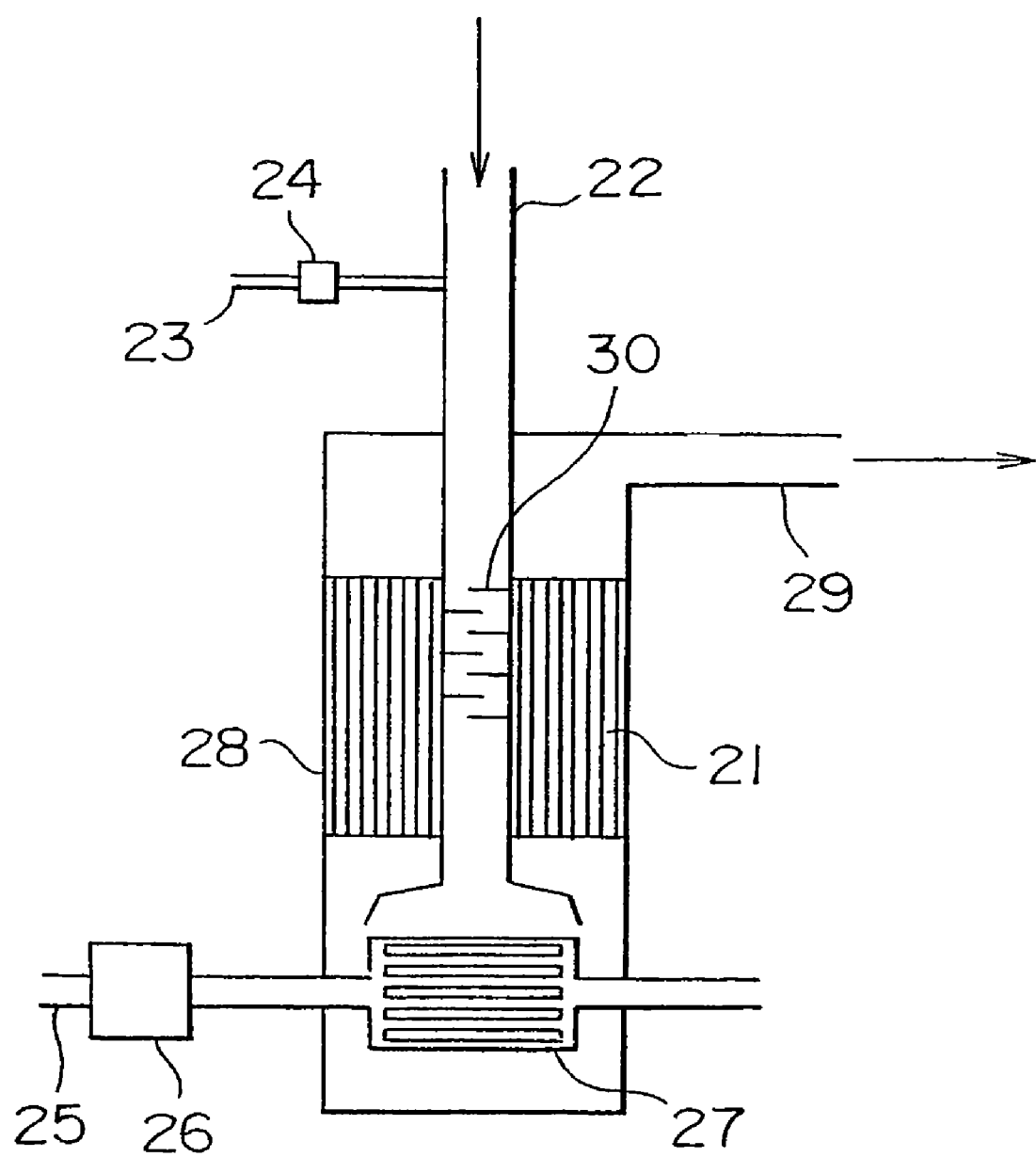
FIG. 4 is a schematic cross-sectional sketch illustrating a hydrogen purifying apparatus embodied in the below-mentioned Embodiment 1-3 of the present invention.

The hydrogen purifying apparatus of Embodiment 1-3 in accordance with the present invention will be described herein. As shown in FIG. 4, the hydrogen purifying apparatus in accordance with the present embodiment comprises a modified gas inlet 22, an air supply duct 23, an air flow rate control valve 24, a cooled water supply duct 25, a cooled water volume control valve 26, a reaction chamber 28 formed on the periphery of a tube-shaped modified gas flow route, a honeycomb catalyst layer 21 formed inside the reaction chamber 28, a heat exchange fin 30 provided on a wall of the modified gas flow route neighboring the downstream side of the catalyst layer 21, and a modified gas outlet 29. The operation and effect of the apparatus of this embodiment are mostly mimicking those of the apparatus of Embodiment 1-2. Therefore, the description of this embodiment will be focused on different features from those of Embodiment 1-2.

FIG. 4 is a schematic cross-sectional sketch illustrating the hydrogen purifying apparatus embodied in Embodiment 1-3. A provision of the heat exchange fin 30 on the wall of the modified gas flow route neighboring the downstream side of the catalyst layer 21 helps to heat the downstream side of the catalyst layer 21 while cooling the modified gas. Such structure also facilitates cooling by a heat exchanger 27. In the event that the flow rate of the modified gas is increased, cooling only by the heat exchanger proves insufficient occasionally when the temperature is elevated greatly due to oxidation heat by CO and hydrogen. However, the structure of the apparatus of this embodiment where heat is radiated from the periphery of the reaction chamber 28 enables to minimize elevation of the temperature of the catalyst layer 21. Therefore, the apparatus can cope with any increases in load due to increased flow rate of the modified gas.

Embodiment 1-4

Figure 5:
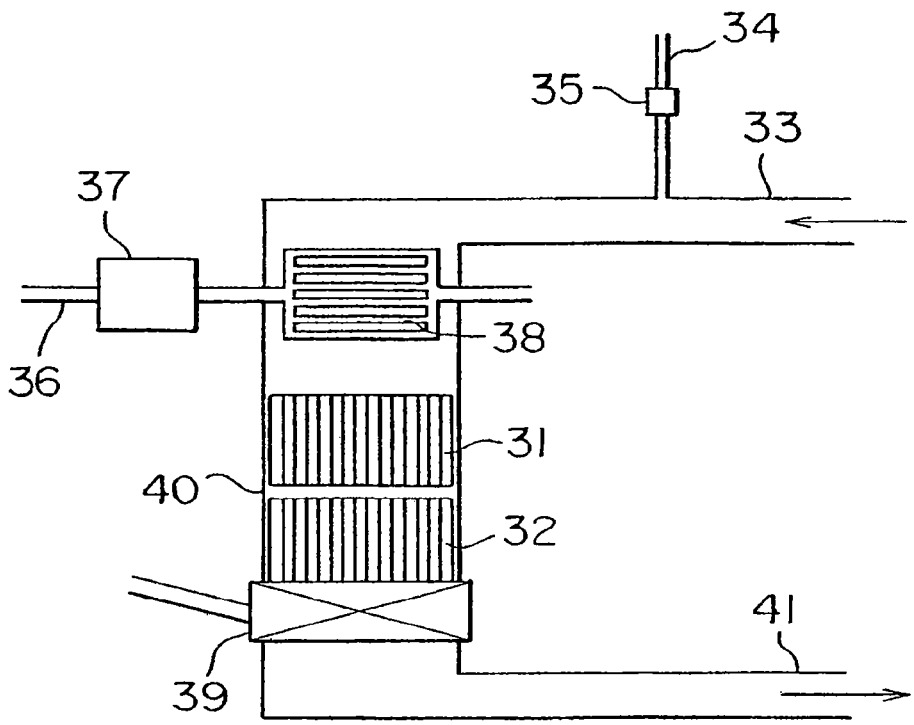
FIG. 5 is a schematic cross-sectional sketch illustrating a hydrogen purifying apparatus embodied in the below-mentioned Embodiment 1-4 of the present invention.

The hydrogen purifying apparatus of Embodiment 1-4 in accordance with the present invention will be described herein. As shown in FIG. 5, the hydrogen purifying apparatus in accordance with the present embodiment comprises, a modified gas inlet 33, an air supply duct 34, an air flow rate control valve 35, a cooled water supply duct 36, a cooled water volume control valve 37, a heat exchanger 38, a honeycomb first catalyst layer 31 formed inside a reaction chamber 40, a second catalyst layer 32 formed downstream from the first catalyst layer 31, and a modified gas outlet 41. The operation and effect of the apparatus of this embodiment are mostly mimicking those of the apparatus of Embodiment 1. Therefore, the description of this embodiment will be focused on different features from those of Embodiment 1.

FIG. 5 is a schematic cross-sectional sketch illustrating the hydrogen purifying apparatus embodied in Embodiment 1-4. The operable temperature range of the catalyst selectively oxidizing CO varies depending on the species of rare metal contained in the catalyst, type of carrier, etc. In the present embodiment, for the first catalyst layer 31, a catalyst operable at high temperatures is used and for the second catalyst layer 32, a catalyst operable at low temperatures. More specifically, a platinum-carrying zeolite was used for the first catalyst layer 31 and a platinum-carrying alumina for the second catalyst layer 32.

Figure 6:
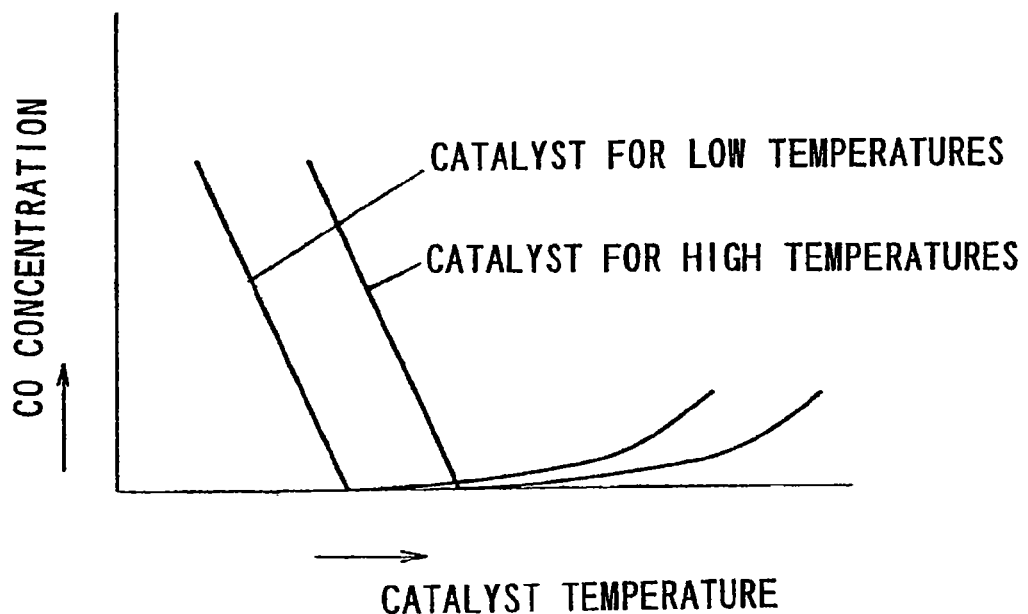
FIG. 6 is a graph illustrating the operation characteristics of a catalyst operating at high temperature and a catalyst operating at low temperature in a hydrogen purifying apparatus embodied in the below-mentioned Embodiment 1-5 of the present invention.

As shown in FIG. 6, the catalyst operable at high temperatures for the first catalyst layer 31 selectively oxidizes only CO at a high success rate when the temperature is high and does not react with CO when the temperature is low, thus allowing non-reacted oxygen to pass away together with CO. Therefore, when the temperature is high, any oxygen is not passed toward the second catalyst layer 32 and therefore the second catalyst layer 32 can play no role in the reaction. To the contrary, when the temperature is low, since oxygen can pass through the first catalyst layer 31 together with CO, the second catalyst layer 32 can play a major role in the reaction thereby removing CO. Moreover, the reaction heat generated at the second catalyst layer 32 heats the downstream side of the first catalyst layer 31, optimizing the temperature distribution of the first catalyst layer 31. As such, arranging two or more catalyst layers each operating in a different temperature range helps to elicit catalytic functions of the catalyst layers in a wide range of temperature.

In the present embodiment, although two honeycomb catalyst layers were arranged, three or more catalyst layers may be arranged. Arrangement of many catalyst layers helps to remove CO efficiently in a wide range of temperature.

Alternatively, the catalyst layer may be unitary integrated without dividing it into the first and the second catalyst layers 31 and 32. Integration of the catalyst layer facilitates the installation in the hydrogen purifying apparatus particularly when the catalyst layer is a pellet.

Alternatively, the second catalyst layer 32 may use a catalyst which catalyzes the reaction between CO and hydrogen to form methane. When the temperature is controlled at a temperature at which the first catalyst layer 31 consumes all oxygen as supplied, the remaining CO can not be oxidized at the second catalyst layer 32 due to depletion of oxygen. The use of the above-mentioned catalyst forming methane from CO helps to cause reaction between CO and hydrogen thereby converting CO to methane. The methane forming reaction of CO is prone to proceed at higher temperature than that of selective CO oxidation reaction. Therefore, the use of a heater 39 for heating the downstream side of the second catalyst layer as embodied in the present embodiment is preferable.

Embodiment 1-5

Figure 7:
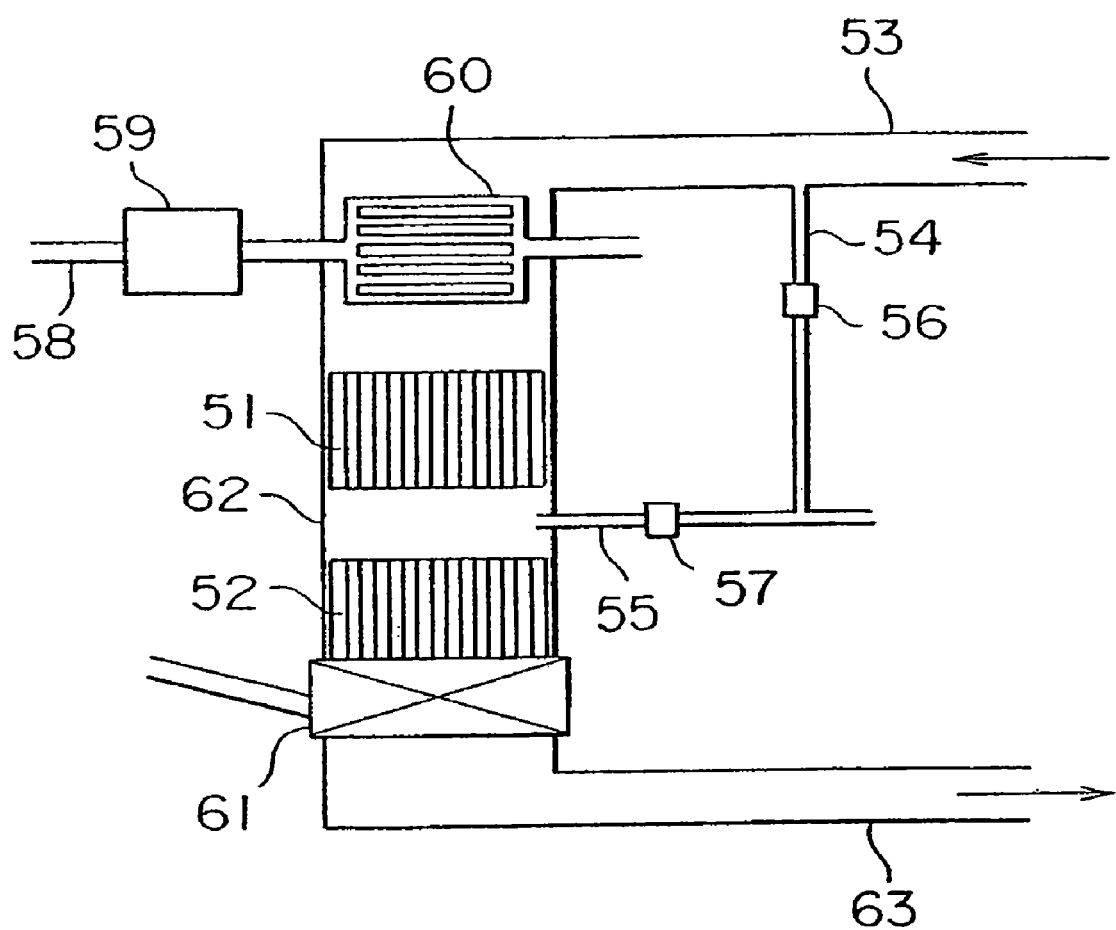
FIG. 7 is a schematic cross-sectional sketch illustrating a hydrogen purifying apparatus embodied in the below-mentioned Embodiment 1-6 of the present invention.

The hydrogen purifying apparatus of Embodiment 1-5 in accordance with the present invention will be described herein. As shown in FIG. 7, the hydrogen purifying apparatus in accordance with the present embodiment comprises a modified gas inlet 53, a first air flow rate control valve 56, a second air flow rate control valve 57, a cooled water supply duct 58, a cooled water volume control valve 59, a honeycomb first catalyst layer 51 and a second catalyst layer 52 formed downstream from the first catalyst layer 51 which are formed inside a reaction chamber 62, wherein a second air supply duct 55 is provided between the first and the second catalyst layers 51 and 52, and a modified gas outlet 63. The operation and effect of the apparatus of this embodiment are mostly mimicking those of the apparatus of Embodiment 1. Therefore, the description of this embodiment will be focused on different features from those of Embodiment 1.

FIG. 7 is a schematic cross-sectional sketch illustrating the hydrogen purifying apparatus embodied in Embodiment 1-5. In the present embodiment, for the first catalyst layer 51, a catalyst operable at low temperatures is used and for the second catalyst layer 52, a catalyst operable at high temperatures is used. When the first catalyst layer 51 is increased in temperature greatly due to reaction between CO and air, the catalyst loses the ability to selectively oxidize CO occasionally. Therefore, air supply from a first air supply duct 54 to the first catalyst layer 51 is reduced by providing the second catalyst layer 52 and the second air supply duct 55 in order to suppress temperature rises at the first catalyst layer 51. As a result, CO can be removed efficiently.

Most CO can be removed at the first catalyst layer 51. However, reduced air supply increases slightly the CO concentration to be exhausted compared to the case of no reduction of air supply. Therefore, air corresponding to the volume of remaining CO in the second catalyst layer 52 is supplied to remove the remaining CO. In the structure of this embodiment, since the first catalyst layer 51 is increased in the ability of selective oxidation of CO by the reduction of temperature rises at the first catalyst layer 51, total amounts of air required by the first and the second catalyst layers 51 and 52 will decrease. Moreover, since the amount of air containing oxygen to be supplied to the second catalyst layer 52 is small and the temperature rise due to oxidation heat of CO is small, the second catalyst layer 52 is heated with a heater 61 in order to retain an optimal temperature of the second catalyst layer 52. In this way, CO can be removed stably and efficiently.

In the present embodiment, the first catalyst layer 51 was formed with the catalyst operating at low temperature and the second catalyst layer 52 with the catalyst operating at high temperature. However, this may be reversed. The use of the catalyst operating at high temperature for the first catalyst layer 51 reduces cooling by a heat exchanger 60. Moreover, the use of the catalyst operating at low temperature for the second catalyst layer 52 enables efficient removal of CO even if the temperature decrease is great due to heat radiation on the way from the first toward the second catalyst layers 51 and 52.

In the foregoing embodiments, Embodiment 1 of the present invention has been described. In the foregoing embodiments, although the hydrogen purifying apparatus used a modified methane gas and a modified methanol gas, the present invention is not limited to these gases and can encompass the below-mentioned examples.

In the present mode of embodiment, any modified gas obtained from other gaseous hydrocarbon fuel, such as propane or butane, and liquid hydrocarbon fuel, such as gasoline or kerosene may be used.

In the foregoing embodiments, although the catalyst carrying platinum on an alumina carrier was mainly used for the catalyst layer, any catalyst can be used similarly if it can selectively oxidize only CO. Applicable examples are noble metallic catalysts such as rhodium, ruthenium, etc., composites of these catalysts, and transition metal composite oxide catalyst having a perovskite structure. Moreover, silica alumina and zeolite may be used in place of alumina as the carrier. If occasion demands, a catalyst which forms methane from CO selectively may be used.

In the foregoing embodiments, although the catalyst layer was a honeycomb, any shape, such as spherical shape or pellet, may be used similarly if only it allows the modified gas to efficiently contact the catalyst and is less in increases of pressure loss.

In the foregoing embodiments, although the modified gas was cooled by means of heat exchange while circulating water, cooling may be done by circulating an oil substance such as ethylene glycol having a high boiling point or a mixed solution of such oil, if necessary, depending on the temperature. Air to be supplied to the area where gas modification is carried out may be used to preheat the modified material gas.

EMBODIMENT 2

In Embodiment 2 of the present invention, a branch which bifurcates downstream from the connection between the material gas supply pathway and the oxidant gas supplying segment and is connected to the reaction segment on the path of the catalyst layer is adopted for the means for cooling the upstream side of the catalyst layer or otherwise for heating the downstream side of the catalyst layer.

More specifically, a branch is formed to vary the amount of oxidant gas to be supplied to the upstream side and the downstream side of the catalyst layer in the reaction segment. This structure enables control of the oxidation reaction of CO which generates heat as appropriate. In other words, this structure reduces temperature rises of the catalyst and prevents development of catalyst reaction in the absence of oxygen.

The hydrogen purifying apparatus having such structure is advantageous because it can be simplified by controlling the branched gas volume based on a ratio of the cross-sectional area of the material gas supply pathway to that of the branch.

The hydrogen purifying apparatus of Embodiment 2 in accordance with the present invention preferably comprises means for changing the cross-sectional areas of both the material gas supply pathway and the branch at their connection to the reaction segment in order to control the volume of the modified gas to be introduced into the reaction segment from the material gas supply pathway and the branch.

The reaction segment may have at least a two-segmented catalyst layer, wherein at least the uppermost catalyst layer has a part inoperable as a catalyst or a part with low reactivity to CO.

Alternatively, the reaction segment may have at least a two-segmented catalyst layer, wherein at least the uppermost catalyst layer is composed of a catalyst pellet and the lowermost catalyst layer is shaped into a honeycomb.

Alternatively, the reaction segment may have at least a two-segmented honeycomb catalyst layer, wherein the uppermost catalyst layer may be larger than the lowermost catalyst layer with respect to an open area of their honeycomb lattice.

It is also preferable that the catalyst constituting the uppermost catalyst layer is a catalyst carrying a platinum group metallic activator on an alumina carrier and the catalyst layer constituting the lowermost catalyst layer is a catalyst carrying an identical platinum group metallic activator on a zeolite carrier.

It is also desirable that the catalyst constituting the uppermost catalyst layer is a catalyst which has been heat-treated at a high temperature than the catalyst constituting the lowermost catalyst layer.

The catalyst layer is preferred to have a temperature measuring segment and means for controlling an amount of oxidant gas to be supplied based on the temperature as measured.

As shown above, the hydrogen purifying apparatus in accordance with Embodiment 2 of the present invention is an apparatus for oxidizing and removing carbon monoxide (CO) in a modified gas containing carbon dioxide, carbon monoxide in addition to a main component hydrogen gas, comprising a catalyst reaction segment having a catalyst layer for oxidizing CO, a material gas supplying segment for supplying the modified gas to the reaction segment via a material gas supply pathway, an oxidant gas supplying segment for supplying an oxidant gas to the modified gas on the path of the material gas supply pathway, and a branch which bifurcates downstream from a connection between the material gas supply pathway and the oxidant gas supplying segment and is connected to the reaction segment on the path of the catalyst layer as means for cooling the catalyst layer at the upstream side or otherwise heating it at the downstream side.

When the reaction segment has a single catalyst layer, two or more reaction segments may be connected and a branch may be formed on the material gas supply pathway to connect thereto not only the upstream reaction segment but also the downstream reaction segment.

In another mode of the present invention, the hydrogen purifying apparatus comprises a catalyst reaction segment arranged with a multi-segmented catalyst layer, a material gas supplying segment connected to the catalyst reaction segment via a material gas supply pathway, and an oxidant gas supplying segment connected halfway to the material gas supply pathway, wherein a catalyst layer with reduced reactivity to CO is arranged on a first segment so as to avoid consumption of all oxygen mixed with the modified gas by the first segment in order to enable a supply of oxygen as far as a terminal segment.

In this structure, it is better to form a part in the first segment which does not function as a catalyst, that is, a part which allows the material gas mixed with oxygen to pass away without reacting thereto, or a part which is reactive more or less but low in reactivity to CO contained in the modified gas.

The part which does not function as a catalyst may be formed on the catalyst layer by providing such a part that carries no catalyst. Otherwise, after forming the catalyst layer with a carrier carrying a catalyst and a support for supporting the carrier, an opening is formed on the support.

The part with low reactivity to CO may be formed on the catalyst layer by providing a part carrying a reduced amount of catalyst.

Reactivity of the catalyst layer to CO decreases with decreases in surface area of the catalyst layer. Therefore, it is better to form the first segment using a catalyst pellet and the terminal segment using a honeycomb.

When the catalyst layer is a honeycomb, the larger an open area of honeycomb lattice, the greater the reduction in reactivity of the catalyst layer to CO. Therefore, it is better that the first segment is formed with a catalyst layer which is larger in open area of honeycomb lattice than that of the terminal segment.

In the hydrogen purifying apparatus of the above-mentioned structure, it is advantageous to form the downstream segment with a catalyst layer which exerts the catalytic activity at higher temperatures than the first segment because this results in stable CO cleanup performance.

This is because a provision of a catalyst layer which exerts the catalytic activity in the same range of temperature as the first segment downstream from the first segment reduces the ability of the downstream segment to selectively oxidize CO, unless the material gas entering the downstream segment is cooled.

Therefore, it is better to use a catalyst layer carrying a platinum group metallic catalyst on an alumina carrier for the first segment and a catalyst layer carrying a platinum group metallic catalyst on a zeolite carrier which exerts the catalytic activity in higher temperatures than the first segment for the terminal segment.

It is also better to use a catalyst layer which has been heat-treated at a higher temperature than the terminal segment for the first segment because any catalyst which has been heat-treated at high temperature is reduced in the active points and the active range of temperature is lowered. For example, when the catalyst layer carries platinum on an alumina carrier, it is better to use a catalyst layer which has been heat-treated at 700° C. to 800° C. for the first segment and a catalyst layer which has been heat-treated at 500° C. or so for the terminal segment.

Furthermore, controlling the volume of oxidant gas to be supplied based on the catalyst layer and the temperature of the catalyst layer as measured by the temperature measuring segment connected to the catalyst layer is effective for regulating elevation in temperature of the catalyst layer.

In the following, Embodiment 2 in accordance with the present invention will be described referring to the drawings.

Embodiment 2-1

Figure 8:
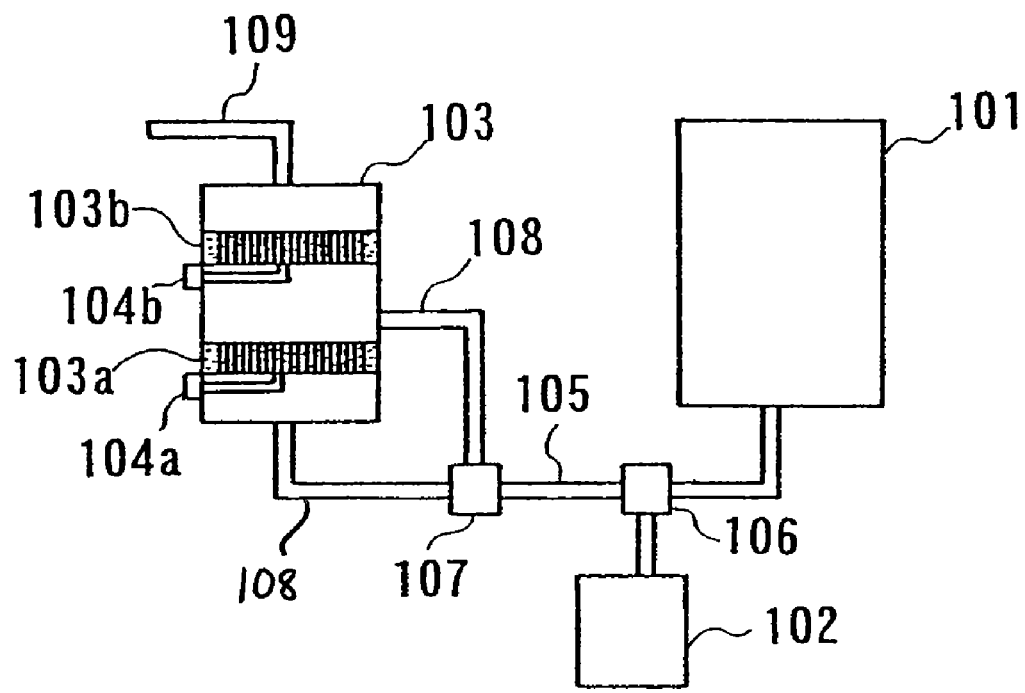
FIG. 8 is a sketch illustrating the structure of a hydrogen purifying apparatus embodied in the below-mentioned Embodiment 2-1 of the present invention.

FIG. 8 illustrates the structure of the hydrogen purifying apparatus embodied in Embodiment 2-1. A catalyst reaction segment 103 is connected to a material gas supply path 105 connected to a material gas supplying segment 101, a material gas exhaust duct 109 connected to a fuel cell, and a branch 108.

The catalyst reaction segment 103 accommodates a first catalyst layer 103*a* and a second catalyst layer 103*b* upstream from the gas flow toward downstream in this order. A temperature measuring segment 104*a* for measuring and indicating a temperature of the first catalyst layer 103*a* and a temperature measuring segment 104*b* for measuring and indicating a temperature of the second catalyst layer 103*b* are also accommodated.

Each of the first and the second catalyst layers 103*a* and 103*b* is composed of a catalyst layer carrying, for example, a platinum group metallic catalyst on a honeycomb carrier. A column filled with a platinum group metallic catalyst shaped into a pellet may also be used.

The branch 108 is open into the catalyst reaction segment 103 downstream from the first catalyst layer 103*a* and upstream from the second catalyst layer 103*b*.

A joint 106 for supplying air entering from an oxidant gas supplying segment 102 is formed on the path of the material gas supply pathway 105. A branched volume control segment 107 connected to the branch 108 is formed between the joint 106 and the catalyst reaction segment 103 to control the volume of material gas to be passed to the branch 108.

The material gas supplying segment 101 has an apparatus for supplying a material gas which supplies hydrogen gas and contains at least a byproduct CO. This supplying apparatus is a reactor which modifies, for example, hydrocarbon material gas, alcohol or naphtha with water vapor to generate hydrogen.

An apparatus for supplying an oxidant gas containing at least oxygen is installed inside the oxidant gas supplying segment 2. This apparatus may be exemplified as air pump supplying air as the oxidant gas, oxygen bomb, etc.

Next, operations of the hydrogen purifying apparatus in accordance with Embodiment 2 of the present invention will be described.

A material gas which has been generated in the material gas supplying segment 101 is supplied to the catalyst reaction segment 103 through the material gas supply pathway 105 while supplying air from the oxidant gas supplying segment 102 through the joint 106 at the same time. At that time, the volume (mole) of oxygen contained in the air is adjusted to, for example, half the volume of CO in the material gas.

Some part of the material gas mixed with oxygen enters the upstream side of the first catalyst layer 103*a* in the catalyst reaction segment 103 through the material gas supply pathway 105. The remaining part enters the downstream side of the first catalyst layer 103*a* through the branch 108 and mixed with the material gas which has passed through the first catalyst layer 103*a*. The volume of the material gas entering the material gas supply pathway 105 and the branch 108 is regulated by the branched volume control segment 107.

Then, the material gas mixture is passed to the second catalyst layer 103*b* to oxidize and remove CO in the material gas there. The material gas from which CO has been removed and cleaned up is supplied to the fuel cell through the material gas exhaust duct 109.

As such, branching the material gas mixed with oxygen to clean up some part of the material gas at the first catalyst layer reduces the amount of heat generating at the first catalyst layer.

Furthermore, since the material gas which avoids the first catalyst layer is passed to the second catalyst layer, temperature rise in the material gas entering the second catalyst layer can be prevented. This in turn suppresses temperature rise in the second catalyst layer. Furthermore, this structure facilitates supply of oxygen necessary for cleaning up the material gas by removing CO at the second catalyst layer thereby preventing depletion of oxygen during catalyst reaction at the second catalyst layer.

As discussed above, the present embodiment allows the catalyst which selectively oxidizes CO to exert the catalytic activity sufficiently and facilitates removal of more amounts of CO, that is, cleanup of the material gas flowing at a high rate.

Furthermore, since this embodiment permthe monistic control of the volume of air to be supplied, an exact volume of air can be supplied and thus consumption of hydrogen gas by excess oxygen can be prevented.

The volume of material gas passing through the upstream side of the first catalyst layer 103a and that passing through the branch 108 may be controlled based on a ratio of the cross-sectional area of the material gas supply pathway 105 to that of the branch 108 without forming the branched volume control segment 107. For example, when the ratio is set at 1:1, the material gas is branched in half.

The above structure facilitates simplified control of the catalyst layer in an optimal range of temperature.

This structure also facilitates control of the catalyst layer temperature with high accuracy by adjusting the branched volume of material gas based on the temperature measured by the catalyst layer temperature measuring segment 104. This is advantageous in cleaning up CO in correspondence with a change in the flow rate of hydrogen. An oxygen volume (mole) in the air to be supplied less than half the volume of CO in the material gas is more likely to lead to depletion of oxygen. Therefore, it is better to determine the air volume to be supplied to make an oxygen volume more than half the volume of CO.

Next, a specific example of operation of the hydrogen purifying apparatus in accordance with Embodiment 2 will be described.

A natural gas modifying apparatus with water vapor is used as a material gas generator of the material gas supplying segment 101. A material gas containing about 80% hydrogen, about 19.5% carbon dioxide and about 0.5% carbon monoxide on the basis of dry gas was generated. The resultant material gas was passed to the material gas supply pathway 105 at a rate of 10 l/min.

Air containing oxygen about twice the volume of CO was supplied to the material gas through the joint 106 using an air pump installed at the oxidant gas supplying segment 102.

After mixed with air, the material gas was branched in about half by the branched volume control segment 107. The branched half was passed to the upstream side of the first catalyst layer 103a in the catalyst reaction segment 103.

Gas chromatography of the material gas collected after it had passed through the first catalyst layer 103a indicated that the material gas contained 10 ppm CO or less. Similar analysis of the material gas collected after it was mixed with the branched material gas indicated that the material gas mixture contained about 0.25% CO and oxygen about twice the volume of CO.

Gas chromatography of the material gas excreted from the material gas exhaust duct 109 revealed the presence of 10 ppm CO or less in the material gas.

A doubling of the volume of material gas to be supplied also decreased the CO concentration in the material gas to as low as 10 ppm or less.

Embodiment 2-2

Figure 9:
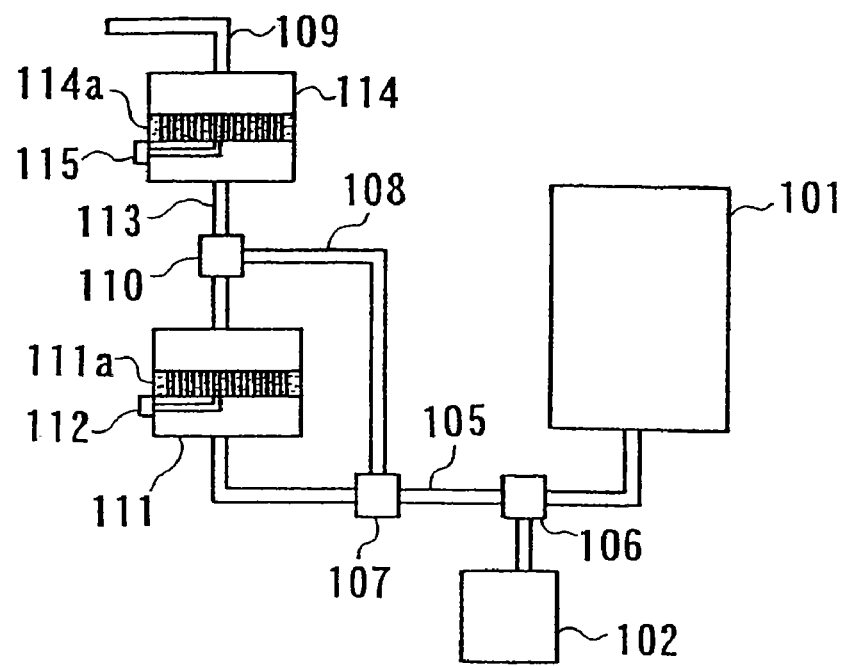
FIG. 9 is a sketch illustrating the structure of a hydrogen purifying apparatus embodied in the below-mentioned Embodiment 2-2 of the present invention.

FIG. 9 illustrates the structure of the hydrogen purifying apparatus in accordance with Embodiment 2-2 of the present invention.

A first catalyst reaction segment 111 is formed upstream from the material gas stream and a second catalyst reaction segment 114 downstream from the material gas stream. The first and the second reaction segments are connected to each other via a communicating path 113.

While the first catalyst reaction segment 111 is connected to a material gas supply pathway 105 which is connected to the material gas supplying segment 101, and the second catalyst reaction segment 114 is connected to a material gas exhaust duct 109 which is connected to a fuel cell. A branch 108 bifurcating from the material gas supply pathway 105 is connected to the communicating path 113 at a junction 110. A joint 106 for supplying air entering from an oxidant gas supplying segment 102 is formed on the path of the material gas supply pathway 105. A branched volume control segment 107 connected to the branch 108 is formed between the joint 106 and the junction 110 to control the volume of material gas to be passed to the branch 108.

A first catalyst layer 111a and a temperature measuring segment 112 for measuring the temperature of the first catalyst layer 111a are formed in the first catalyst reaction segment 111. Similarly, a second catalyst layer 114a and a temperature measuring segment 115 for measuring the temperature of the second catalyst layer 114a are formed in the second catalyst reaction segment 114. The remaining parts are formed in the same manner as in Embodiment 2-1.

A division of the catalyst reaction segment into two parts facilitates effectively mixing the material gas which has passed through the first reaction segment with the material gas which is supplied through the branch 108. This structure also facilitates effectively cooling the material gas which has been heated at the first catalyst reaction segment whereby cleanup of CO can be performed stably.

Embodiment 2-3

Figure 10:
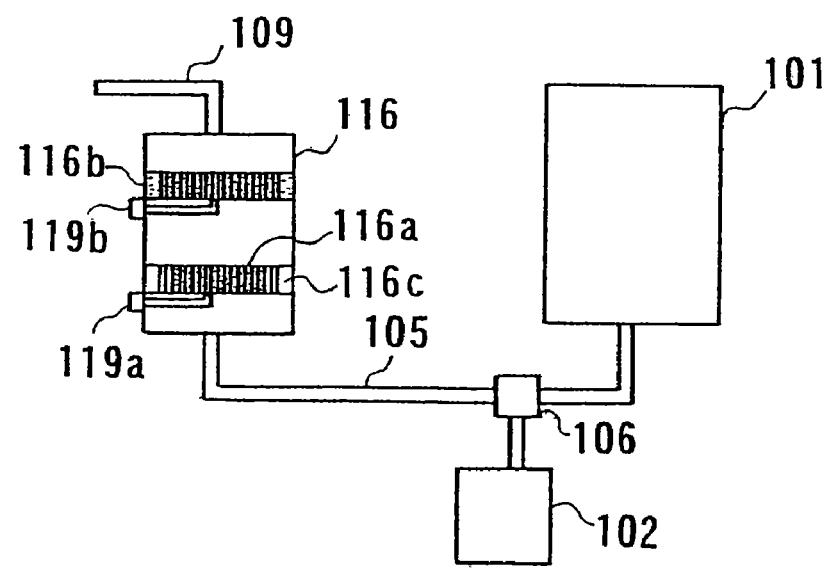
FIG. 10 is a sketch illustrating the structure of a hydrogen purifying apparatus embodied in the below-mentioned Embodiment 2-3 of the present invention.
Figure 11:
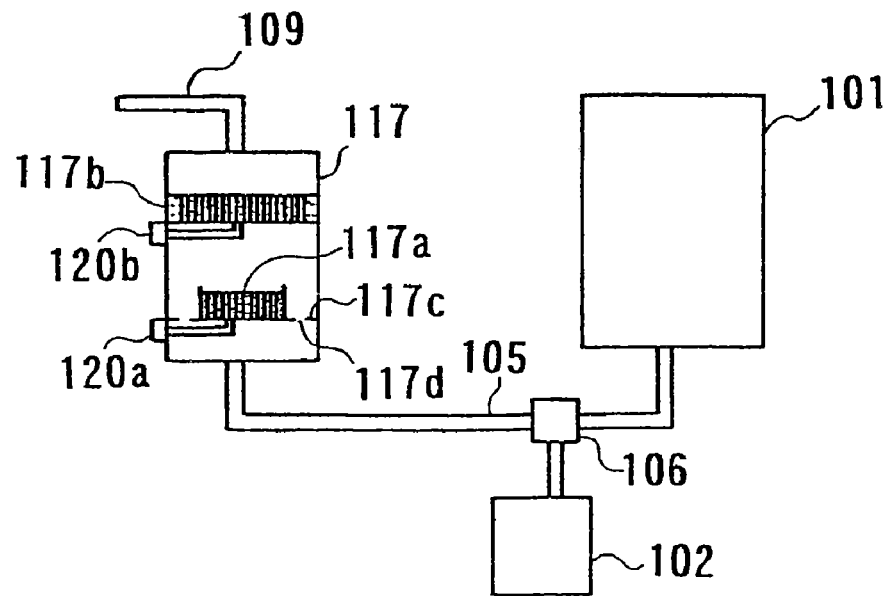
FIG. 11 is a sketch illustrating the structure of a hydrogen purifying apparatus embodied in the below-mentioned Embodiment 2-4 of the present invention.

FIG. 10 shows the structure of the hydrogen purifying apparatus in accordance with Embodiment 2-3 of the present invention.

A catalyst reaction segment 116 is connected not only to a material gas supply pathway 105 which is connected to a material gas supplying segment 101 but also to a material gas exhaust duct 109 which is connected to a fuel cell.

The catalyst reaction segment 116 accommodates a first catalyst layer 116a and a second catalyst 116b upstream from the catalyst reaction segment 116 toward downstream in this order. The catalyst reaction segment 116 also accommodates a temperature measuring segment 119a for measuring and indicating the temperature of the first catalyst layer 116a and a temperature measuring segment 119b for measuring and indicating the temperature of the second catalyst layer 116b. The first catalyst layer 116a has a catalyst-free part 116c at the periphery. A joint 106 for supplying air from an oxidant gas supplying segment 102 is formed on the path of the material gas supply pathway 105. Identical apparatuses to those of Embodiment 2-1 are installed in the material gas supplying segment 101 and the oxidant gas supplying segment 102.

In the present embodiment, the material gas is not branched after it is supplied and mixed with air in order to pass all the material gas to the catalyst reaction segment 116 and the first catalyst layer has the catalyst-free part 116c.

Since oxidation reaction does not occur at the catalyst-free part 116c, the material gas which has passed through this part is not elevated in temperature. Moreover, no oxygen is consumed at this part. Therefore, sufficient and stable cleanup of CO can be performed at the second catalyst layer 116b.

Omission of a branch on the flow route of material gas which has been supplied and mixed with the oxidant gas simplifies the structure of the resultant hydrogen purifying apparatus.

The position of the catalyst-free part in the catalyst layer is not limited to the periphery of the catalyst layer and it may be positioned at any site in the catalyst layer, such as center, for example.

The volume of material gas which has not been treated and is to be passed to the second catalyst layer can be regulated based on a ratio of area of the catalyst-carrying part of the catalyst layer to that of the catalyst-free part.

For example, when the ratio is 1:1 to 1:10 or so, cleanup of CO can be performed stably.

In the following, an example of concrete operations of the hydrogen purifying apparatus of this embodiment will be described.

After setting the ratio of the area of the catalyst-carrying part 116a to that of the catalyst-free part 116c at 1:1, air was supplied to the material gas generated in the same manner as in Embodiment 2-1. The material gas was passed into the catalyst reaction segment 116 in order to treat the material gas. Gas chromatography of the material gas excreted from the material gas exhaust duct 109 indicated that the material gas contained 10 ppm CO or less.

Then, even when the supplied amount of material gas was doubled, a CO concentration of 10 ppm or less could be achieved.

The ratio of the area of the catalyst-carrying part to that of the catalyst-free part should desirably be determined in correspondence with the cleaning up ability of the catalyst used and it is not limited to the range of 1:1 to 1:10.

Embodiment 2-4

FIG. 1*l* illustrates the structure of the hydrogen purifying apparatus in accordance with Embodiment 2-4 of the present invention.

A catalyst reaction segment 117 is connected to both a material gas supply pathway 105 which is connected to a material gas supplying segment 101 and a material gas exhaust pipe 109 which is connected to a fuel cell. A joint 106 for supplying air entering from an oxidant gas supplying segment 102 is formed on the path of the material gas supply pathway 105.

The catalyst reaction segment 117 accommodates a first catalyst layer and a second catalyst layer 117b upstream from the catalyst reaction segment to downward in this order. The first catalyst layer is composed of a catalyst carrying part 117a which carries a platinum group metallic catalyst and a support 117c formed on the periphery of the catalyst carrying part 117a. The support has an air vent hole 117d. The catalyst reaction segment 117 also accommodates a temperature measuring segment 120a for measuring and indicating the temperature of the catalyst carrying part 117a and a temperature measuring segment 120b for measuring and indicating the temperature of the second catalyst layer 117b. The remaining parts are arranged in the same manner as in Embodiment 2-3.

Since the material gas which has passed through the air vent hole 117d is not elevated in temperature and has consumed no oxygen, the second catalyst layer can clean up CO sufficiently.

When a ratio of the total area of the air vent hole 117d to the area of the catalyst carrying part 117a is 1:1 to 1:10 or so, CO cleanup can be done stably; however, the ratio should desirably be determined in correspondence with the cleaning up ability of the catalyst used and is not limited to the range of 1:1 to 1:10.

Embodiment 2-5

Figure 12:
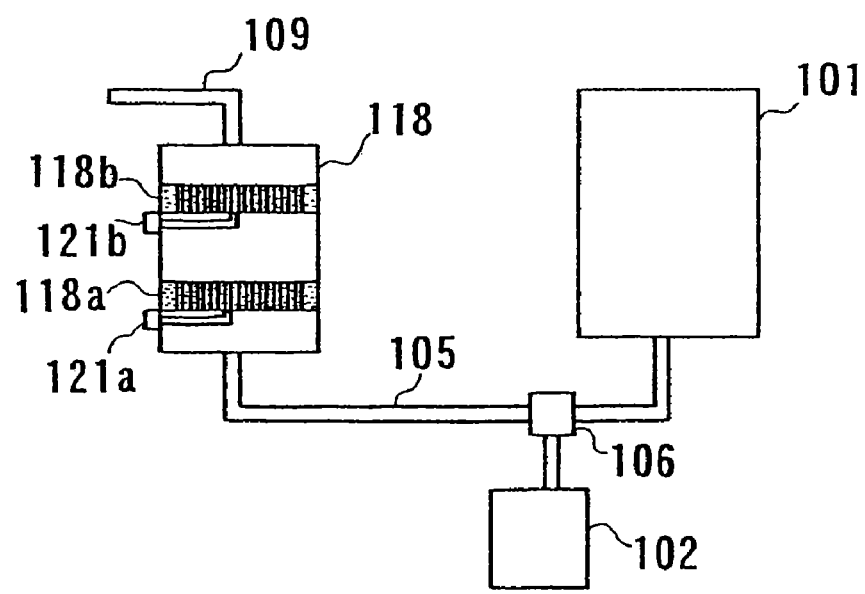
FIG. 12 is a sketch illustrating the structure of a hydrogen purifying apparatus embodied in the below-mentioned Embodiment 2-5 of the present invention.

FIG. 12 illustrates the structure of the hydrogen purifying apparatus in accordance with Embodiment 2-5 of the present invention.

A catalyst reaction segment 118 is connected to a material gas supply pathway 105 which is connected to a material gas supplying segment 101 and a material gas exhaust duct 109 which is connected to a fuel cell. A joint 106 for supplying air entering from an oxidant gas supplying segment 102 is formed on the path of the material gas supply pathway 105.

The catalyst reaction segment 118 accommodates a first catalyst layer 118a and a second catalyst layer 118b upstream from the catalyst reaction segment 118 to downward in this order. The catalyst reaction segment 118 also accommodates a temperature measuring segment 121a for measuring and indicating the temperature of the first catalyst layer 118a and a temperature measuring segment 121b for measuring and indicating the temperature of the second catalyst layer 118b. For the first catalyst layer 118a, a catalyst layer with a less number of honeycomb lattices per unit area than that of the second catalyst layer 118b is used. The remaining parts are arranged in the same manner as in Embodiment 2-3.

The use of such catalyst layer with reduced reactivity to CO for the first catalyst layer prevents consumption of all oxygen supplied to the material gas at the first catalyst layer and thus allows oxygen to be passed to the second catalyst layer. This structure also enables suppression of temperature rise at the first catalyst layer thereby suppressing temperature rise of the material gas when it passes through the second catalyst layer. As a result, cleanup of CO can be done sufficiently at the second catalyst layer.

The first catalyst layer 118a may be formed using a catalyst layer shaped in a pellet and the second catalyst layer 118b using a catalyst layer carrying a catalyst on a honeycomb carrier.

Embodiment 2-6

Figure 13:
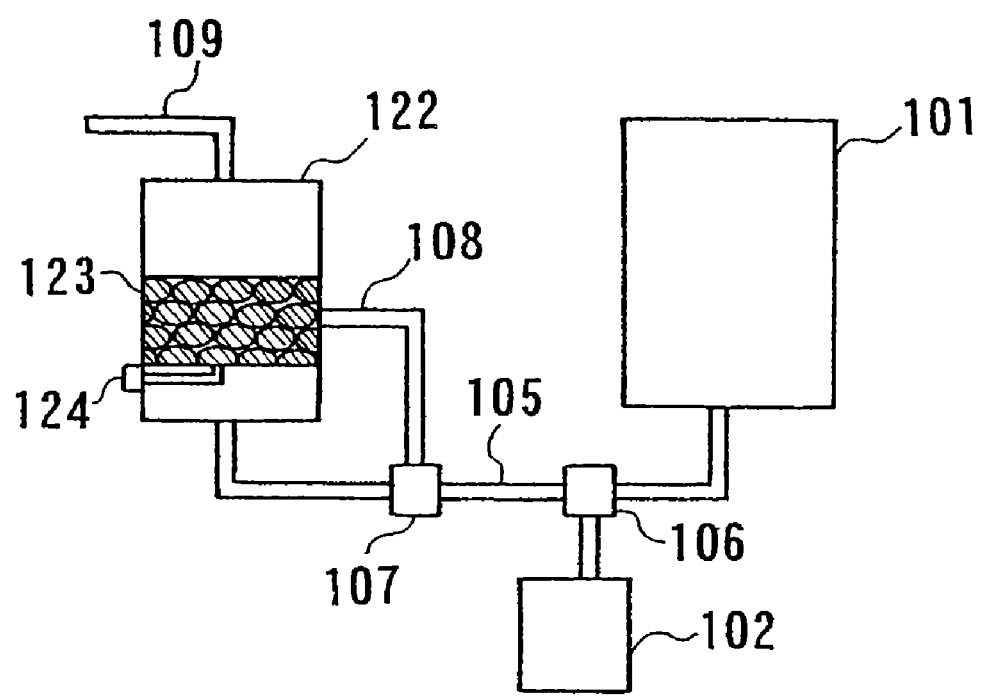
FIG. 13 is a sketch illustrating the structure of a hydrogen purifying apparatus embodied in the below-mentioned Embodiment 2-6 of the present invention.

FIG. 13 illustrates the structure of the hydrogen purifying apparatus in accordance with Embodiment 2-6 of the present invention.

A catalyst reaction segment 122 is connected to a material gas supply pathway 105 which is connected to a material gas supplying segment 101, a material gas exhaust duct 109 which is connected to a fuel cell, and a branch 108. A joint 106 for supplying air entering from an oxidant gas supplying segment 102 is formed on the path of the material gas supply pathway 105. A branched volume control segment 107 connected to the branch 108 is formed between the joint 106 and the catalyst reaction segment 122 to control the volume of material gas to be passed to the branch 108.

The catalyst reaction segment 122 accommodates a catalyst layer 123 and a temperature measuring segment 124 for measuring and indicating the temperature of the catalyst layer 123. The catalyst layer 123 is a column filled with a platinum group metallic catalyst shaped in a pellet. The branch 108 is connected to the catalyst reaction segment 122 on a side of the catalyst layer 123. The remaining parts are arranged in the same manner as in Embodiment 2-1.

Such structure reduces heat generation at the catalyst layer 123. Furthermore, since material gas which has been branched on the way to the catalyst layer 123 is supplied for cleaning up CO in the modified gas, CO in the modified gas can be cleaned up sufficiently.

In the following, examples of Embodiment 1 in accordance with the present invention will be described.

Example 1

An alumina carrying platinum was coated on a codierite honeycomb of 50 mm diameter and 100 mm length to form the catalyst layer 1. The catalyst layer 1 thus formed was placed in the reaction chamber 9 of the hydrogen purifying apparatus as shown in FIG. 1 and then a modified gas containing 1% CO, 15% carbon dioxide, 15% water vapor and hydrogen for the rest was introduced into the apparatus through the modified gas inlet 2 at a rate of 101 l/mm. Open air was supplied from the air supply duct at 1 l/mm. The temperature of the mixed modified gas with air was cooled to 100° C. with the heat exchanger 7 in which water is circulated to cause reaction between CO and oxygen at the catalyst layer 1. The catalyst layer 1 was heated with the heater 8 at the downstream side to make a temperature of 150° C. Measurement of temperature distribution on the catalyst layer 1 indicated an almost linear elevation from upstream side toward downstream. The composition of the modified gas which was excreted from the modified gas outlet 10 after it had passed through the catalyst layer 1 was measured by gas chromatography. The result indicated a CO concentration of 5 ppm. Then, the flow rate of water circulating inside the heat exchanger 7 was varied to alter the temperature of the modified gas to 90° C. and 80° C. The CO concentration in the resultant modified gas was 6 ppm and 9 ppm, respectively. Then, the set temperature of the heater 8 was varied to adjust the temperature of the downstream side of the catalyst layer 1 to 140° C. and 160° C. The CO concentration in the resultant modified gas was 4 ppm and 9 ppm, respectively.

Example 2

In this example, the catalyst layer as formed in the above Example 1 was installed inside the reaction chamber 18 as shown in FIG. 3 and a modified gas was introduced into the apparatus through the modified gas inlet 12. Measurement of the temperature of the modified gas at the modified gas inlet 12 showed 200° C. Measurement of the temperature of the downstream side of the catalyst layer 11 which had been heated by the heat exchange fin 20 showed 150° C. Then the modified gas was cooled down to 100° C. using the heat exchanger 17 and reacted at the catalyst layer 11. This produced a CO concentration of 5 ppm.

Example 3

As shown in FIG. 4, a codierite honeycomb base of 100 mm diameter and 100 mm length having a punched hole of 80 mm diameter in the center was coated with an identical catalyst to that in Example 1 to form the catalyst layer 21. Measurement of the temperature of the downstream side of the catalyst layer 21 which had been heated by the heat exchange fin 30 showed 150° C. Then, the modified gas was cooled down to 100° C. using the heat exchanger 27 and reacted at the catalyst layer 21. This produced a CO concentration of 4 ppm.

Example 4

A codierite honeycomb of 50 mm diameter and 50 mm length was coated with platinum-carrying mordenite to form the first catalyst layer 31. Similarly, a codierite honeycomb of the same size was coated with platinum-carrying alumina to form the second catalyst layer 32. The first and the second catalyst layers 31 and 32 thus formed were placed in the reaction chamber 40 as shown in FIG. 5. Then, the modified gas was cooled down to 140° C. using the heat exchanger 38. The temperature of the second catalyst layer 32 was controlled with a heater 39 such that the downstream side had a temperature of 160° C. Measurement of the temperature of the downstream side of the first catalyst layer 31 showed 150° C. Measurement of the CO concentration at the modified gas outlet 41 indicated 1 ppm.

Example 5

In this example, a codierite honeycomb measuring 50 mm in diameter and 50 mm in length was coated with platinum-carrying mordenite to form the first catalyst layer 51. Similarly, a codierite honeycomb of the same size was coated with platinum-carrying alumina to form the second catalyst layer 52. Both the first and the second catalyst layers 51 and 52 were installed in the reaction chamber 62 as shown in FIG. 7. The modified gas was cooled down to 150° C. using the heat exchanger 60. The temperature of the second catalyst layer 52 was controlled with the heater 61 such that the downstream side had a temperature of 130° C. Measurement of the temperature at the downstream side of the first catalyst layer 51 and the upstream side of the second catalyst layer 52 indicated 140° C. for the former and 100° C. for the latter. Measurement of the CO concentration at the modified gas outlet 63 showed 2 ppm.

Comparative Example 1

After omitting the heater 8 from the apparatus of Example 1, the modified gas was introduced into the apparatus through the modified gas inlet 2 in the same manner as in Example 1. The modified gas was cooled down to 100° C. using the heat exchanger 7 and reacted at the catalyst layer 1. Measurement of the temperature distribution in the catalyst layer 1 showed a temperature of 100° C. at the upstream side. The temperature showed a linear decrease toward downstream and the temperature was 90° C. at the lowermost. Gas chromatography of the composition of the modified gas excreted from the modified gas outlet 10 after it had passed through the catalyst layer 1 indicated a CO concentration of 2,000 ppm. Then, the flow rate of the circulating water in the heat exchanger 7 was changed to vary the temperature of the modified gas to 90° C., 110° C. and 120° C. These temperatures produced CO concentrations of 5,000 ppm, 200 ppm and 500 ppm, respectively.

Comparative Example 2

The heater 61 was omitted from the apparatus of Example 5. Measurement of the temperature at the downstream side of the first catalyst layer 51, and at the upstream side and downstream side of the second catalyst layer 52 indicated 140° C., 100° C. and 90° C., respectively. The CO concentration measured at the modified gas outlet 63 was 500 ppm.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for purifying hydrogen by oxidizing and removing carbon monoxide in a reformed gas containing carbon monoxide in addition to a main component of hydrogen gas, the method comprising:

supplying an oxidant gas to the reformed gas for reacting with carbon monoxide in a catalyst bed for oxidizing carbon monoxide, passing a stream of the reformed gas with the oxidant gas supplied thereto through a hydrogen purifying apparatus having:
  a gas inlet;
  a gas outlet;
  a reaction chamber accommodating the catalyst bed, the reaction chamber and catalyst bed each having a downstream side and an upstream side, wherein the downstream side is in fluid communication with the gas outlet; and
  a gas flow route external to and circumscribing the reaction chamber, the gas flow route having a downstream side and an upstream side, wherein the upstream side of the gas flow route is in fluid communication with the gas inlet and wherein the upstream side of each of the reaction chamber and catalyst bed is in fluid communication with the downstream side of the gas flow route, passing the reformed gas through the gas flow route countercurrent to gas flow within the reaction chamber and catalyst bed, performing direct heat exchange between a downstream side of the catalyst bed and the upstream side of the gas flow route, and performing direct heat exchange between an upstream side of the catalyst bed and the downstream side of the gas flow route.

2. The method in accordance with claim 1, wherein the upstream side of the catalyst bed is formed of a different catalyst material than a catalyst material of the downstream side of the catalyst bed, and the catalyst material constituting the downstream side of the catalyst bed has a lower activation temperature for carbon monoxide than the catalyst material constituting the upstream side of the catalyst bed.

3. The method in accordance with claim 2, wherein at least a portion of the catalyst material in the upstream and downstream sides of the catalyst bed is supported by a metallic material.

4. The method in accordance with claim 1, further comprising changing an amount of oxidant gas to be supplied in correspondence with a temperature of the catalyst bed.

5. The method in accordance with claim 1, wherein the reaction chamber includes a heat exchange fin protruding toward an interior of the gas flow route on the downstream side of the catalyst bed.

6. The method in accordance with claim 1, wherein the reaction chamber is a tube-shaped reaction chamber concentric about the gas flow route.

7. The method in accordance with claim 1, further comprising cooling the reformed gas before the reformed gas flows into the reaction chamber and the catalyst bed.

* * * * *

UNITED STATES PATENT AND TRADEMARK OFFICE
CERTIFICATE OF CORRECTION

PATENT NO. : 7,674,445 B2  Page 1 of 1
APPLICATION NO. : 11/456027
DATED : March 9, 2010
INVENTOR(S) : Kiyoshi Taguchi et al.

It is certified that error appears in the above-identified patent and that said Letters Patent is hereby corrected as shown below:

Title page, item (75),

The spelling of the last inventor listed should read: -- Kouichiro Kitagawa --.

Signed and Sealed this

Thirty-first Day of August, 2010

David J. Kappos
*Director of the United States Patent and Trademark Office*